United States Patent [19]

Inoue et al.

[11] Patent Number: 5,811,047
[45] Date of Patent: Sep. 22, 1998

[54] POLYOLEFIN PACKAGING MATERIAL FOR DRUG PACKAGING, METHOD OF PRODUCTION THEREOF AND CONTAINERS FOR DRUG PACKAGING

[75] Inventors: Fujio Inoue; Masamitsu Izumi; Shigetoshi Kashiyama, all of Naruto; Hiroshi Tanaka, Ichihara, all of Japan

[73] Assignees: Otsuka Pharmaceutical Factory, Inc., Tokushima; Mitsui Petrochemical Industries, Ltd., Tokyo, both of Japan

[21] Appl. No.: 617,311

[22] Filed: Mar. 18, 1996

Related U.S. Application Data

[63] Continuation of Ser. No. 240,731, filed as PCT/JP93/01257 Sep. 6, 1993, abandoned.

[30] Foreign Application Priority Data

Sep. 11, 1992 [JP] Japan ..................................... 4-242479

[51] Int. Cl.⁶ ....................................................... B01D 3/06
[52] U.S. Cl. ......................... 264/176.1; 264/102; 264/141
[58] Field of Search ..................................... 264/102, 141, 264/176.1

[56] References Cited

U.S. PATENT DOCUMENTS

| 4,094,942 | 6/1978 | Nakai et al. | 264/102 |
| 4,129,552 | 12/1978 | Galaj et al. | 260/45.9 |
| 4,372,758 | 2/1983 | Bobst et al. | 55/48 |
| 4,698,395 | 10/1987 | Inoue et al. | 525/327.8 |
| 5,039,549 | 8/1991 | Nguyen et al. | 427/54.1 |

FOREIGN PATENT DOCUMENTS

| A0047077 | 3/1982 | European Pat. Off. . |
| A0584926 | 3/1994 | European Pat. Off. . |
| A2022197 | 7/1970 | France . |
| A1272778 | 5/1972 | United Kingdom . |
| 2204048 | 11/1988 | United Kingdom . |
| WO 9215621 | 9/1992 | WIPO . |

*Primary Examiner*—Charles Nold
*Attorney, Agent, or Firm*—Sughrue, Mion, Zinn, Macpeak & Seas, PLLC

[57] ABSTRACT

The invention provides a polyolefin drug packaging material characterized in that the content, in the polyolefin, of substances containing 12 to 26 carbon atoms is not more than 150 ppm. The packaging material of the invention is useful because the risk of its reacting with and adversely affecting the drug packaged therewith is minimum.

3 Claims, No Drawings

POLYOLEFIN PACKAGING MATERIAL FOR DRUG PACKAGING, METHOD OF PRODUCTION THEREOF AND CONTAINERS FOR DRUG PACKAGING

This is a Continuation of application Ser. No. 08/240,731, filed as PCT/JP93/01257 Sep. 6, 1993, now abandoned.

TECHNICAL FIELD

The present invention relates to a polyolefin packaging material for drug packaging and, more particularly, to a polyolefin packaging material for drug packaging which is free or substantially free of the risk of its reacting with and adversely affecting the drug packaged therewith.

BACKGROUND ART

Packaging materials for packing various drugs or medicinal chemicals, including antibiotics, either in dosage forms or as bulk substances, are required to be heat-sealable and flexible as well as free of plasticizer and other additives that may exert adverse influences on the drugs. From these viewpoints, polyolefin films, in particular linear low-density polyethylene (hereinafter referred to "LLDPE") films have generally been used. However, certain kinds of drugs, in particular cephem, β-lactam, carbapenem, aminoglycoside, polypeptide, macrolide antibiotics and the like, may interact with the above-mentioned polyolefin films, though to slight extents, thus producing objectionable reaction products. The formation of such reaction products detracts from drug purity and/or causes turbidity of solutions on the occasion of dissolution or reconstitution. It is possible that the reaction products adversely affect patients. Therefore, glass vials have exclusively been used in storing such antibiotics as mentioned above while film packaging has been avoided in such cases.

In recent years, a method has been developed in the United States of America according to which a unit dose of an antibiotic is placed in a flexible container made of a polyolefin, in place of a glass vial, so that the antibiotic may be dissolved and administered with greater convenience (cf. e.g. Japanese Patent Publication No. H03-33337). Even in that case, however, no regard has been paid to the formation of reaction products resulting from contact of the container with the drug, hence decreases in potency and/or unsatisfactory dissolution may unfavorably result with the lapse of time. For preventing such potency decreases, it is necessary to store the drug-containing flexible container in a cold place. Even in a frozen state, interactions between the drug and the container cannot be inhibited, however. Thus, the above method is not fully satisfactory from the handling standpoint.

Recently, in particular, the so-called kit, which is a combination of a drug container such as mentioned above and a container for a solvent, has been a favorite subject of research and development. From the viewpoint of implementation of such kits as well, the problem of interaction between the container (particularly the polyolefin resin constituting it) and the drug is an urgent problem to be solved.

DISCLOSURE OF THE INVENTION

Accordingly, it is an object of the present invention to provide a novel drug packaging material with which the above-mentioned problems can be solved. In other words, it is an object of the invention to provide a novel packaging material for drug packaging which will not cause drug decomposition or deterioration due to the interaction with the drug mentioned above, thus will neither cause decreases in potency or formation of undesirable reaction products nor produce adverse effects on patients upon administration.

The inventors of the present invention made incessant investigations to accomplish the above object and, as a result, found that certain low-molecular-weight substances occurring in the polyolefin, whether incorporated as impurity in the stage of resin production or formed in the stage of film forming or the like are the factors responsible for said interaction. Furthermore, they found that said low-molecular-weight substances can be removed by certain means and further that the formation of the substances can be prevented or suppressed under specific forming conditions. These findings have now led to completion of the present invention.

Thus the invention is concerned with a polyolefin packaging material for drug packaging which is characterized in that the amount of substances containing 12 to 26 carbon atoms is not more than 150 ppm, in particular a polyolefin packaging material for drug packaging in which the polyolefin is LLDPE.

The "amount of substances containing 12 to 26 carbon atoms" mentioned above is expressed in the value obtained by determining, by gas chromatography, the amount of said substances in an n-hexane extract from a resin sample. This value differs from the value obtained by direct gas chromatographic analysis of the resin sample as such. There is no exact correlationship between the two values. In the present specification, the value for the above-mentioned specific low-molecular-weight substances in an n-hexane extract is employed since it correlates well with the resin-drug interaction.

As revealed by the investigations made by the inventors, the above-mentioned specific low-molecular-weight substances migrate gradually from the resin. When the resin is directly subjected to gas chromatography, these substances can be detected only in very low concentrations. However, when the resin is actually used for the purpose of drug packaging, the above specific low-molecular weight substances migrate gradually from the resin during storage following packaging to produce the serious adverse influence mentioned above. Thus, the amount of low-molecular-weight substances in the resin as determined by direct measurement is of little significance. Rather, the amount of the low-molecular-weight substances as measured by the above-mentioned method in which the amount of the low-molecular-weight substances migrating during use of the resin is also taken into consideration, namely the method involving n-hexane extraction, is of great importance. Thus, the conventional polyolefin packaging materials, whose content of said low-molecular-weight substances containing 12 to 26 carbon atoms exceeds 150 ppm as measured by the method mentioned above (generally at least about 200 ppm), undergo undesirable interactions with the drug packaged to reduce the intrinsic value of the drug. On the contrary, when the amount mentioned above is reduced to 150 ppm or below, the adverse influences mentioned above are no longer exerted and safe packaging materials can be obtained in a stable manner.

More specifically, the above-mentioned low-molecular-weight substance determination method involving n-hexane extraction may comprise extracting a resin film sample with n-hexane (for example, extracting the resin with about 80 ml, per gram of resin, of n-hexane for about 8 to 12 hours using a Soxhlet extractor) and analyzing the thus-obtained extract fraction containing low-molecular weight substances by thermal desorption cold trap gas chromatography (TCT-GC). The extractor, gas chromatograph and others to be used in the above method can suitably be selected on a case-by-case basis. Any change or modification in these respects will little affect the measured value for low-molecular-weight substances. It is to be noted that even a resin showing a different low-molecular-weight substances content as measured by a method other than the method specified herein falls within the scope of the present invention if the measured value obtained by the method specified herein is within the range mentioned above.

The packaging material of the invention can be produced by using one, or a combination of two or more, of those polyolefins which are generally produced and commercially available, for example ethylene polymers, ethylene-α-olefin copolymers, propylene polymers, propylene-α-olefin copolymers and further homopolymers and copolymers of α-olefins containing 3 to 20 carbon atoms.

More particularly, the packaging material of the invention can be produced by removing low-molecular-substances contained in a polyolefin and then forming the polyolefin into an appropriate form, for example a flat or cylindrical film or sheet, or by forming the polyolefin into the above form while removing low-molecular-weight substances from the polyolefin, or by removing low-molecular-weight substances from the polyolefin formed in advance into a film or sheet form.

The above-mentioned treatment for removing low-molecular-weight substances can be carried out by per se known means, for example vent pelletization, vent sheeting, vacuum drying, or washing with a solvent.

Among the means mentioned above, the vent pelletization method comprises pelletizing a molten resin by extruding it under reduced pressure. When this method is used as the means for removing the low-molecular-weight substances mentioned above, the operating conditions can suitably be selected depending on the resin to be treated but, generally, the resin temperature should preferably be within the range of 150° to 300° C. and the pressure should preferably be reduced to 100 torr or below. If the resin temperature is elevated, low-molecular-weight substances may be removed to an extent sufficient for the desired packaging material of the invention even when the extent of pressure reduction is not so remarkable. An excessively high temperature, however, is undesirable, for such treatment would give rise to a rather deteriorated resin containing low-molecular-weight substances. On the other hand, if a lower resin temperature is selected, such a deteriorated resin as mentioned above will not be produced but the pressure is required to be close to zero, whereby the operating conditions become too severe. The lower resin temperatures are thus unfavorable, too. In treating, in particular, LLDPE [density=0.920 g/cm$^3$ (according to ASTM D 1505); melt flow rate (MFR)=2.0 g/10 minutes (according to ASTM D 1238)], for instance, by the above-mentioned vent pelletization technique for obtaining a desired polyolefin for use in the invention from which low-molecular-weight substances have been removed, the following conditions are preferably employed: a resin temperature of 170° to 230° C., more preferably around 230° C., and a reduced pressure of not more than 10 torr, more preferably not more than 5 torr.

The vent sheeting method comprises forming a molten resin into a film or sheet while extruding said resin under reduced pressure. This method can be carried out under substantially the same operating conditions (resin temperature and reduced pressure conditions) for removing low-molecular-weight substances as the vent pelletization method mentioned above.

Further, in employing the solvent washing method for removing the low-molecular-weight substances, water, hot water, n-hexane or the like, for instance, can be used as the solvent. The washing operation with such a solvent may be performed with resin pellets prior to forming or with the packaging material after forming and, in either case, the desired low-molecular-weight substances removing effect can be obtained.

The vacuum drying method comprises allowing resin pellets or molded packaging materials to stand under reduced pressure with warming to thereby attain the intended removal of low-molecular-weight substances. However, this method is inferior in elimination efficiency to the methods mentioned above, hence is not so effective in commercial practice.

In forming the treated resin pellets obtained by the vent pelletiziation method mentioned above into the form of a sheet or film, the forming operation may be performed by various methods using a variety of per se known equipment. On that occasion, too, those conditions which will minimize the formation of a deteriorated resin or the like should preferably be employed. Said conditions may vary to a certain extent depending on the resin and can suitably be selected. In forming the above-mentioned LLDPE, taken as an example of the resin, using a T-die forming machine, the resin temperature is preferably around 230° C. and the takeup speed about 5 meters per minute. When an inflation forming machine is used, the resin temperature is suitably about 130° to 175° C. and the takeup speed about 7 to 8 meters per minute. The forming processes mentioned above are preferably performed in an inert gas atmosphere such as nitrogen gas atmosphere.

In this manner, the desired polyolefin packaging material for drug packaging of the invention that has a low-molecular-weight substance content of not more than 150 ppm can be produced.

Although the treatment process for removing the low-molecular-weight substances and the process of forming the treated resin into a film or sheet form have been described hereinabove taking LLDPE as an example, the other kinds of resin mentioned can be treated and formed in substantially the same manner as said LLDPE. When necessary, the above-mentioned LLDPE may be subjected to forming in admixture with an appropriate amount of a resin of a different kind. As the resin of a different kind, there may be mentioned, among others, the polyolefin resins mentioned above. It is desirable that said resins be also treated for reducing the content of low-molecular-weight substances. However, when they are admixed only in small proportions or low in low-molecular-weight substance content by nature, the additive resins may be admixed as they are. In any case, the total amount of the low-molecular-weight substances in question should be not more than 150 ppm.

The packaging material of the invention is substantially free of low-molecular-weight substances which would undergo interactions with the drug packaged therewith and yet retains the characteristics fundamentally required of a packaging material, for example flexibility, transparency and heat-sealability, among others. Therefore, the packaging material of the invention can be used effectively as a drug packaging material in the same manner as the conventional packaging materials of this kind. Thus, said packaging material may be used as such, namely in a single-layer form, for packaging drugs or may be made into a multilayer film (laminated film) with a resin of a different kind or some other appropriate material. The laminate can be used in the same manner as the single-layer material, for example as bags for packaging bulk or powdery drugs. Furthermore, the packaging material of the invention can be molded or shaped into an appropriate drug container form by a conventional method. In addition, blow-molded containers can be manufactured by ordinary blow forming using the treated resin pellets mentioned above.

As examples of the drug that can be packaged stably and safely with the packaging material of the invention, there may be mentioned antibiotics such as cephems, e.g. cefazolin, β-lactams, e.g. ampicillin, carbapenems, e.g. imipenem, aminoglycosides, e.g. kanamycin, polypeptide antibiotics, e.g. vancomycin, macrolides, e.g. erythromycin and the like.

For further illustrating the present invention, several examples are given below which are concerned with the production of the packaging material of the invention. Comparative examples are also given for the production of some packaging materials for comparison. A test example is further given for these packaging materials.

EXAMPLE 1

LLDPE resin pellets [manufactured by Mitsui Petrochemical Industries; density 0.920 g/cm$^3$ (according to ASTM D1505, the same applies hereinafter), MFR 2.2 g/10 minutes (according to ASTM D1238, hereinafter the same shall apply)] wore treated using a vent-type twin-screw extruder (output 200 kg/hour) at a resin temperature of 230° C. and a reduced pressure of 0 to 5 torr. A 145-μm-thick film was manufactured from the thus-treated pellets using a T-die forming machine (the whole piping inclusive of the hopper was purged with nitrogen) at a resin temperature of 230° C. and a takeup speed of 5 m/minute.

EXAMPLE 2

A 145-μm-thick film was manufactured from the same treated pellets as used in example 1 using a water-cooled inflation forming machine (the whole piping inclusive of the hopper was purged with nitrogen) at a resin temperature of 130° to 175° C. (no film-cooling air blower was used) and a takeup speed of 7 to 8 meters per minute.

EXAMPLE 3

LLDPE resin pellets (manufactured by Mitsui Chemical Industries; density 0.940 g/cm$^3$, MFR 2.2 g/10 minutes) were treated in the same manner as in Example 1 and a 145-μm-thick film was manufactured from the treated pellets in the same manner as in Example 1.

EXAMPLE 4

A 145-μm-thick film was manufactured in the same manner as in Example 2 using the same treated pellets as prepared in Example 1 and polypropylene pellets (manufactured by Mitsui Petrochemical Industries; density 0.910 g/cm$^3$, MFR 7.0 g/10 minutes) in a weight ratio of 2:1.

COMPARATIVE EXAMPLE 1

A 145-μm-thick film was manufactured from LLDPE resin pellets (manufactured by Mitsui Petrochemical Industries; density 0.920 g/cm$^3$, MFR 2.2 g/10 minutes) using a T-die forming machine (the whole piping inclusive of the hopper was purged with nitrogen) at a resin temperature of 230° C. and a takeup speed of 5 meters per minute.

COMPARATIVE EXAMPLE 2

A 145-μm-thick film was manufactured from the same treated pellets as prepared in Example 1 using a T-die forming machine (the whole piping inclusive of the hopper was purged with nitrogen) at a resin temperature of 250° C. and a takeup speed of 5 meters per minute.

COMPARATIVE EXAMPLE 3

A 145-μm-thick film was manufactured from LLDPE resin pellets (manufactured by Mitsui Petrochemical Industries; density 0.920 g/m$^3$, MFR 2.2 g/10 minutes) using a water-cooled inflation forming machine (the whole piping inclusive of the hopper was purged with nitrogen) at a resin temperature of 130° to 175° C. (no film cooling air blower was used) and a takeup speed of 7 to 8 meters per minute.

TEST EXAMPLE 1

Bags, 10 cm×10 cm in size, were manufactured using the films of the invention manufactured as mentioned above in Examples 1 to 4 and the comparative films manufactured in Comparative Examples 1 to 3. One gram (potency) of cefazolin sodium was placed in each bag, followed by heat sealing. The bags were respectively wrapped in aluminum foil and stored at 60° C. for 7 days. After the storage period, each bag was opened, the contents were dissolved in 5 ml of pure water and the optical transmittance of the obtained solution (770 nm) was measured. When the optical transmittance was not less than 99.5%, the drug was regarded as having been successfully stored. In a control test, 1 g (potency) of cefazolin sodium was placed in a glass ampule and, after sealing, the whole was stored under the same conditions as mentioned above. The optical transmittance of the solution of the contents was then measured in the same manner.

On the other hand, the amount of substances containing 12 to 26 carbon atoms was determined for each film in the following manner. Thus, each film sample was cut into strips, 4 cm×0.5 cm in size, and extracted with 80 ml, per gram, of n-hexane for 8 to 12 hours using a Soxhlet extractor. The extract was concentrated under reduced pressure and the residue was analyzed using a TCT-GC apparatus (Chromatopak) to thereby determine the amount of substances containing 12 to 26 carbon atoms (in ppm). For charging into the apparatus, the sample was dissolved in n-hexane to a certain concentration, followed by adsorption on glass wool.

The results thus obtained are shown in Table 1. The data on each film is the mean of three measurements.

TABLE 1

| Sample film | Transmittance (%) | Amount of $C_{12}$–$C_{26}$ low-molecular-weight substances in n-hexane extract (ppm) |
| --- | --- | --- |
| Film of Example 1 | 99.9 | 100.2 |
| Film of Example 2 | 99.8 | 139.5 |
| Film of Example 3 | 99.9 | 99.8 |
| Film of Example 4 | 99.8 | 145.0 |
| Film of Comparative Example 1 | 98.6 | 180.6 |
| Film of Comparative | 97.3 | 188.9 |

TABLE 1-continued

| Sample film | Transmittance (%) | Amount of $C_{12}$–$C_{26}$ low-molecular-weight substances in n-hexane extract (ppm) |
|---|---|---|
| Example 2 | | |
| Film of Comparative Example 3 | 98.3 | 190.1 |
| Control (glass ampule) | 99.9 | — |

The results shown above in Table 1 clearly indicate that the films of the invention, owing to the fact that the amount therein of substances containing 12 to 26 carbon atoms is as low as below 150 ppm, can package the antibiotic stably and successfully prevent chemical changes thereof, such as decomposition and deterioration, as can glass ampules. In contrast, it is seen that when the comparative films whose content of substances containing 12 to 26 carbon atoms exceeds 150 ppm, are used, the antibiotic undergoes chemical changes (reactions) upon contact with said films, whereby the transmittance is lowered.

We claim:

1. A method for producing a drug packaging film or sheet made of a polyolefin with a content of low-molecular weight substances containing 12 to 26 carbon atoms of not more than 150 ppm, which comprises treating a polyolefin with a vent-type extruder at a resin temperature of 150° to 300° C. and a reduced pressure of 100 torr or below and then forming the thus-treated polyolefin into a film or sheet.

2. A method for producing a drug packaging film or sheet made of a polyolefin with a content of low-molecular weight substances containing 12 to 26 carbon atoms of not more than 150 ppm, which comprises extrusion-forming the polyolefin into a film or sheet while treating the polyolefin with a vent-type extruder at a resin temperature of 150° to 300° C. and a reduced pressure of 100 torr or below.

3. A method for producing the drug packaging polyolefin film or sheet according to claim 1, which comprises treating a linear low-density polyethylene at a resin temperature of 170° to 230° C. and a reduced pressure of 10 torr or below.

* * * * *

UNITED STATES PATENT AND TRADEMARK OFFICE
CERTIFICATE OF CORRECTION

PATENT NO. : 5,811,047
DATED : September 22, 1998
INVENTOR(S) : Fujio Inoue, et. al.

It is certified that error appears in the above-identified patent and that said Letters Patent is hereby corrected as shown below:

IN THE CLAIMS:

1. (Amended) A method for producing a drug packaging film or sheet made of a polyolefin with a content of low-molecular weight substances containing 12 to 26 carbon atoms of not more than 150 ppm, which comprises treating a polyolefin with a vent-type extruder at a resin temperature of 150° to 300° C. and a reduced pressure of 100 torr or below and then forming the thus-treated polyolefin into a film or sheet; wherein the film or sheet has a multilayer structure and contains an antibiotic, and wherein the polyolefin is a linear low-density polyethylene.

2. (Amended) A method for producing a drug packaging film or sheet made of a polyolefin with a content of low-molecular weight substances containing 12 to 26 carbon atoms of not more than 150 ppm, which comprises extrusion-forming the polyolefin into a film or sheet while treating the polyolefin with a vent-type extruder at a resin temperature of 150° to 300° C. and a reduced pressure of 100 torr or below; wherein the film or sheet has a multilayer structure and contains an antibiotic, and wherein the polyolefin is a linear low-density polyethylene.

Signed and Sealed this

Twenty-first Day of September, 1999

Attest:

Q. TODD DICKINSON

*Attesting Officer*   *Acting Commissioner of Patents and Trademarks*